United States Patent [19]

Economy et al.

[11] 3,784,405

[45] *Jan. 8, 1974

[54] OXYBENZOYL POLYESTER COATED ARTICLES

[75] Inventors: James Economy, Buffalo; Steve G. Cottis, Amherst; Bernard E. Norwalk, Lancaster, all of N.Y.

[73] Assignee: The Carborundum Company, Niagara Falls, N.Y.

[ * ] Notice: The portion of the term of this patent subsequent to Jan. 25, 1989, has been disclaimed.

[22] Filed: Oct. 8, 1971

[21] Appl. No.: 187,713

Related U.S. Application Data

[62] Division of Ser. No. 828,693, May 28, 1969, Pat. No. 3,656,994.

[52] U.S. Cl........... 117/132 C, 117/123, 117/161 K
[51] Int. Cl..................... B32b 15/08, C09d 3/68
[58] Field of Search................. 117/132 B, 132 C, 117/161 UC, 161 K, 123; 260/47 C

[56] References Cited

UNITED STATES PATENTS

| 3,637,595 | 1/1972 | Cottis et al. | 260/47 |
| 3,444,131 | 5/1969 | Rosenbrock et al. | 117/128.4 X |
| 3,039,994 | 6/1962 | Gleim | 260/47 |
| 2,471,023 | 5/1949 | Cook et al. | 260/78.3 |

FOREIGN PATENTS OR APPLICATIONS

| 660,883 | 11/1951 | Great Britain | 260/47 |

*Primary Examiner*—William D. Martin
*Assistant Examiner*—Harry J. Gwinnell
*Attorney*—David E. Dougherty et al.

[57] ABSTRACT

A substrate coated with an impervious film of an oxybenzoyl polyester having a molecular weight of at least about 3,500.

9 Claims, 1 Drawing Figure

PATENTED JAN 8 1974
3,784,405
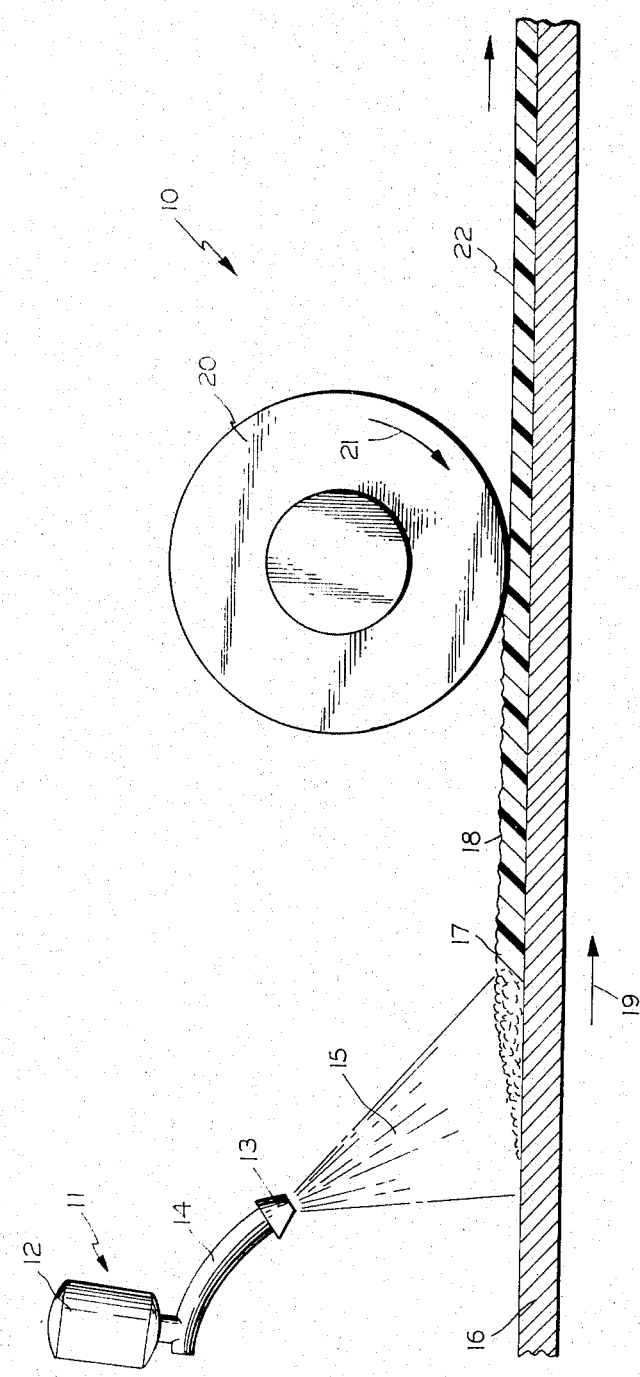
INVENTORS
JAMES ECONOMY
STEVE GUST COTTIS
BERNARD EDWARD NOWAK

OXYBENZOYL POLYESTER COATED ARTICLES

This is a division of U.S. patent application Ser. No. 828,693, filed May 28, 1969, now U.S. Pat. No. 3,656,994, issued Apr. 18, 1972.

According to certain recently discovered techniques it is now possible to produce high molecular weight oxybenzoyl polyesters which are highly resistant to acids and solvents at temperatures up to and sometimes exceeding 700°F. Because of the advantageous physical and chemical properties of these polyesters considerable effort has been expended in attempting to find processes for providing a substrate coated with these polyesters. One process that has met with limited success is the application of the polyester in a hot particulate form onto the substrate by various methods such as flame spraying. While such processes provide good adhesion of the polyester film to the substrate, they unfortunately produce a film of high porosity due principally to voids and/or pinholes in the film. This porosity adversely affects the electrical properties of the coating, and permits the passage of acids, bases and solvents through the film which can result in undesirable attack of the underlying substrate. An additional disadvantage of the above described process is that it results in a film having a rough surface texture.

It is therefore an object of the present invention to provide a process for producing substrates coated with oxybenzoyl polyesters which is substantially free of one or more of the disadvantages of prior processes.

Another object is to provide an improved process for reducing the porosity of an oxybenzoyl polyester film.

A further object is to provide an improved process for producing a substrate coated with an oxybenzoyl polyester film which is resistant to attack by acids, bases and solvents.

A still further object is to provide an improved process for producing a substrate having an oxybenzoyl polyester film with a smooth surface texture.

Yet another object is to provide an improved substrate having an oxybenzoyl polyester coating thereon.

Additional objects and advantages of the present invention will be apparent to those skilled to the art by reference to the following detailed description thereof and the single FIGURE of the drawing which is a schematic representation of a preferred embodiment of the process of the present invention.

According to the present invention there is provided a process for reducing the porosity of an oxybenzoyl polyester film by subjecting the surface of the film to a shearing action preferably in a direction parallel to the surface of the film.

The shearing action can be effected in a number of different ways. For example it can be accomplished by abrading the surface of the film with a polishing wheel or other rotary instrument containing a fine grit such as sand paper. Alternatively the shearing action can be applied by a smooth surface such as the surface of a smooth rotating roller or simply a hand held laboratory spatula.

The invention may be better understood by reference to the single FIGURE of the drawing wherein there is schematically shown an apparatus 10 suitable for practicing the process of the present invention. In this embodiment a flame spray gun 11 comprising a holder 12 for the oxybenzoyl polyester and a nozzle 13 connected to the holder 12 by a tube 14 is employed to first mix oxygen and acetylene from sources not shown and then pass this mixture through the tube 14 drawing the oxybenzoyl polyester from the holder 12 by venturi action and projecting the mixture 15 of hot gases and oxybenzoyl polyester onto the substrate 16 to form a film 17. The surface 18 of the film 17 is rough and the body thereof contains pinholes and voids due to incomplete coalescence of the particles of oxybenzoyl polyester present in the mixture 15. The substrate 16 is moved in the direction of the arrow 19 and passes under a roller 20 moving in the direction of the arrow 21. The surface of the roller 30 can be highly polished or can be an abrasive wheel of silicon carbide or any other hard material which will abrade the surface. As the substrate 16 passes under the roller 20 the surface 18 of the film 17 is subjected to a shearing action by the roller 20 in a direction substantially parallel to the surface 18 of the film 17. The shearing action is preferably applied with sufficient force to cause some plastic deformation of the film 17 to produce a substrate 16 coated with a film 17 the upper surface 22 of which is impervious.

The oxybenzoyl polyesters useful in the present invention are generally those of repeating units of Formula I:

(I)
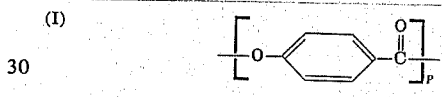

One preferred class of oxybenzoyl polyesters are those of Formula II:

(II)
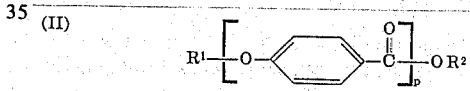

wherein $R^1$ is a member selected from the group consisting of benzoyl, lower alkanoyl, or preferably hydrogen; wherein $R^2$ is hydrogen, benzyl, lower alkyl, or preferably phenyl and $p$ is an integer from 3 to 600 and preferably 30 to 200. These values of $p$ correspond to a molecular weight of about 1,000 to 72,000 and preferably 3,500 to 25,000. The synthesis of these polyesters is described in detail in U.S. Pat. application Ser. No. 619,577 filed Mar. 1, 1967, entitled "Polyesters Based on Hydroxybenzoic Acids," now abandoned, the disclosure of which is incorporated herein by reference.

Another preferred class of oxybenzoyl polyesters are copolyesters of recurring units of Formulae I, III and IV:

(III)
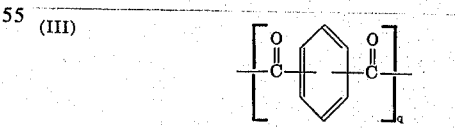

(IV)
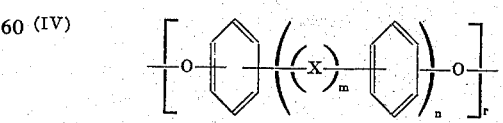

wherein X is —O— or —$SO_2$—; $m$ is 0 or 1; $n$ is 0 or 1; $q:r$ = 10:15 to 15:10; $p:q$ = 1:100 to 100:1; $p+q+r$ = 3 to 600; and preferably 30 to 200. The carbonyl groups of the moiety of Formula I or III are linked to the oxy groups of a moiety of Formula I or IV; the oxy groups of the moiety of Formula I or IV are linked to the carbonyl groups of the moiety of Formula I or III.

The preferred copolyesters are those of recurring units of Formula V:

(V)

The synthesis of these polyesters is described in detail in U.S. Pat. application Ser. No. 828,484 entitled "P-Oxybenzoyl Copolyesters", now U.S. Pat. No. 3,637,595, issued Jan. 25, 1972, the disclosure of which is incorporated herein by reference.

The polyesters useful in the present invention can also be chemically modified by various means such as by inclusion in the polyester of monofunctional reactants such as benzoic acid, or tri- or higher functional reactants such as trimesic acid or cyanuric chloride. The benzene rings in these polyesters are preferably unsubstituted but can be substituted with non-interferring substituents examples of which include among others halogen such as chlorine or fluorine, lower alkoxy such as methoxy and lower alkyl such as methyl.

A wide variety of substrates can be employed in the present invention examples of which include among others ferrous metals such as iron or steel, non-ferrous metals such as brass, titanium, aluminum or copper, and non-metals such as stone or concrete.

The polyesters useful in the present invention can be employed in their pure form, mixed with one another or with a wide variety of organic and/or inorganic fillers. Examples of suitable organic fillers include among others polyhalogenated addition polymers such as polytetrafluoroethylene and condensation polymers such as polyimides. Examples of suitable inorganic fillers include among others graphite, zinc, molybdenum disulfide, and glass fibers. These fillers can comprise up to 70 wt percent of the combined weight of polyester and filler.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

A mixture of 856 g of phenyl para-hydroxybenzoate, 0.015 g of tetra-n-butyl orthotitanate and 1800 g of a polychlorinated polyphenyl solvent (b.p. 360°–370°C) is heated, with constant stirring and under an atmosphere of flowing nitrogen, at 170°–190°C for 4 hours and then at 340°–360°C for 10 hours. Early in this heating cycle the mixture becomes a homogeneous liquid. During the heating cycle condensation occurs, accompanied by the distillation of phenol, and the polyester which is produced thereby forms a precipitate. The mixture is cooled to room temperature and extracted with acetone to remove the polychlorinated polyphenyl solvent, and the product is dried overnight in vacuum at 60°C. A yield of 377 g of polyester powder is obtained, consisting essentially of a para-oxybenzoyl polyester.

EXAMPLE 2

This example illustrates the synthesis of a copolyester useful in the present invention.

The following quantities of the following ingredients are combined as indicated.

| Item | Ingredient | Quantity | |
|---|---|---|---|
| | | Grams | Moles |
| A | P-hydroxybenzoic Acid | 138 | 1 |
| B | Phenyl acetate | 170 | 1.25 |
| C | Therminol 77 | 500 | — |
| D | Diphenyl Terephthalate | 318 | 1 |
| E | Hydrogen Chloride | — | — |
| F | Hydroquinone | 111 | 1.01 |
| G | Therminol 77 | 500 | — |

Items A – D are charged to a four-necked, round bottom flask fitted with a thermometer, a stirrer, a combined nitrogen and HCl inlet and an outlet connected to a condenser. Nitrogen is passed slowly through the inlet. The flask and its contents are heated to 180°C whereupon HCl is bubbled through the reaction mixture. The outlet head temperatures is kept at 110°–120°C by external heating during p-hydroxybenzoic acid, phenyl acetate ester exchange reaction.

The flask and its contents are stirred at 180°–190° and the mixture stirred at 220° for 3.5 hours. Up to this point, 159 grams of distillate are collected in the condenser. Item F is then added and the temperature gradually increased from 220°C to 320°C over a period of 10 hours (10°C/hr.). Stirring is continued at 320°C for 16 hours and then for three additional hours at 340°C to form a slurry. The total amount of distillate, consisting of phenol, acetic acid and phenyl acetate, amounts to 384g. Item G is added and the reaction mixture permitted to cool to 70°C. Acetone (750 ml) is added and the slurry filtered, the solids are extracted in a soxhlet with acetone to remove items C and G. The solids are dried in vacuo at 110°C overnight whereupon the resultant copolyester (320g, 89.2 percent of theory) is recovered as a granular powder.

EXAMPLE 3

This example illustrates the process of the present invention wherein the polyester film is subjected to a shearing action compared to a control film.

A ¼ inch thick mild steel plate substrate is sprayed with the granular polyester of Example 1 depositing the polyester as a 0.003 inch thick film. The film is permitted to cool to room temperature and the coated plate cut into two identical parts. The first part is immersed untreated in concentrated hydrochloric acid. Bubbles form on the surface of the polyester film and in a few minutes the entire film lifts away from the substrate.

The second part is lightly polished with a rotary abrasive polishing disk having No. 000 sandpaper thereon and then immersed in hydrochloric acid of the same strength. No bubbles appear on the surface of the polyester film which continues to adhere tenaciously to the substrate.

EXAMPLE 4

The procedure of Example 3 is repeated except that the shearing action is applied to the film by a hand held laboratory spatula instead of polishing disk with similar results.

EXAMPLE 5

The procedure of Example 3 is repeated except that the film and substrate are heated to 100° C. before polishing with similar results.

EXAMPLE 6

This example illustrates the process of the present invention wherein the film was deposited by the hot dip procedure.

A steel plate ¼ × 1 × 5 inches was heated to 600°C and dipped into a container of the polyester of Example 1. The plate is then withdrawn and the adhering polyester film permitted to cool and polished as in Example 2.

EXAMPLE 7

The procedure of Examples 3 through 6 are repeated except that the polyester of Example 1 is replaced by the polyester of Example 2 with similar results.

EXAMPLE 8

The procedure of Example 3 is repeated except that the spraying there done by a flame spray apparatus is now done by a plasma spray apparatus. The polyester adheres even better to the substrate.

Although the invention has been described in considerable detail with refernece to certain preferred embodiments thereof, it will be understood that variations and modifications can be effected within the spirit and scope of the invention as described above and as defined in the appended claims.

We claim:

1. A substrate coated with an impervious film of an oxybenzoyl polyester, said oxybenzoyl polyester having a molecular weight of at least about 3,500 and being selected from the group consisting of:
   a. A polyester having the formula

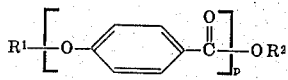

wherein $R^1$ is selected from the group consisting of benzoyl, lower alkanoyl and hydrogen; $R^2$ is phenyl; and $p$ is an integer from 30 to 200; and
   b. A polyester consisting essentially of recurring structural units of Formulas I, III and IV (I) 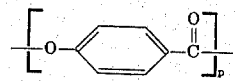

(III) 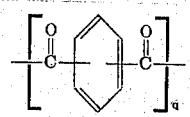

(IV) 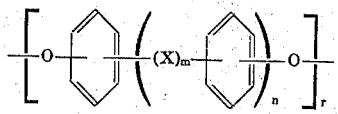

wherein X is —O— or —SO$_2$—; $m$ is 0 or 1; $n$ is 0 or 1; $q:r = 10:15$ to $15:10$; $p:q = 1:100$ to $100:1$; $p + q + r = 30$ to 200; the carbonyl groups of the moiety of Formula I or III are linked to the oxy groups of the moiety of Formula I or IV; and the oxy groups of the moiety of Formula I or IV are linked to the carbonyl groups of the moiety of Formula I or III.

2. A coated substrate as set forth in claim 1, said substrate being metal.

3. A coated substrate as set forth in claim 1 wherein said oxybenzoyl polyester has the formula

wherein $R^1$ is selected from the group consisting of benzoyl, lower alkanoyl and hydrogen; $R^2$ is phenyl; and $p$ is an integer from 30 to 200.

4. A coated substrate as set forth in claim 3 wherein $R^1$ is selected from the group consisting of lower alkanoyl and hydrogen.

5. A coated substrate as set forth in claim 3 wherein $R^1$ is hydrogen.

6. A coated substrate as set forth in claim 1 wherein said oxybenzoyl polyester has a molecular weight of from 3,500 to 25,000 and consists essentially of recurring structural units of Formulas I, III and IV.

7. A coated substrate as set forth in claim 6 wherein $m$ is 0.

8. A coated substrate as set forth in claim 6 wherein $n$ is 0.

9. A coated substrate as set forth in claim 6 wherein said oxybenzoyl polyester consists essentially of recurring units of the formula

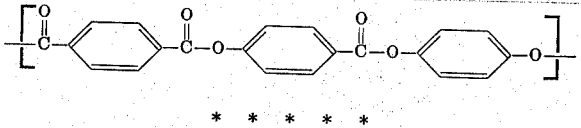

* * * * *